(12) United States Patent
Fritz et al.

(10) Patent No.: US 12,043,098 B2
(45) Date of Patent: Jul. 23, 2024

(54) METHOD FOR USING AN ELECTRIC MOTOR TO GENERATE SOUND, SAID ELECTRIC MOTOR BEING EMPLOYED TO DRIVE A VEHICLE ROOF COMPONENT

(71) Applicant: Webasto SE, Stockdorf (DE)

(72) Inventors: Tobias Fritz, Stockdorf (DE); Benedikt Kainz, Stockdorf (DE); Heinz Seiler, Stockdorf (DE); Oliver Heisel, Stockdorf (DE); Michael Huelsen, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 415 days.

(21) Appl. No.: 17/297,500

(22) PCT Filed: Mar. 4, 2020

(86) PCT No.: PCT/EP2020/055650
§ 371 (c)(1),
(2) Date: May 27, 2021

(87) PCT Pub. No.: WO2020/187566
PCT Pub. Date: Sep. 24, 2020

(65) Prior Publication Data
US 2022/0032750 A1 Feb. 3, 2022

(30) Foreign Application Priority Data
Mar. 18, 2019 (DE) .................. 10 2019 106 748.0

(51) Int. Cl.
*E05F 15/659* (2015.01)
*B60J 7/057* (2006.01)
*G10K 9/12* (2006.01)

(52) U.S. Cl.
CPC .............. *B60J 7/0573* (2013.01); *G10K 9/12* (2013.01)

(58) Field of Classification Search
CPC ......... B60J 7/0573; G10K 9/12; G10K 15/00; G10K 2210/1282
See application file for complete search history.

(56) References Cited

U.S. PATENT DOCUMENTS 5,213,562 A * 5/1993 Monroe .................... G09B 5/04
600/545
7,050,593 B1 * 5/2006 Emerling ................. H04R 5/02
181/161

(Continued)

FOREIGN PATENT DOCUMENTS

DE  102007001007 A1  7/2008
DE  102008033414 A1  1/2010

(Continued)

OTHER PUBLICATIONS

International Search Report for PCT/EP2020/055650 mailed Jun. 24, 2020 in English and German (5 pages).

(Continued)

*Primary Examiner* — Muhammad S Islam
(74) *Attorney, Agent, or Firm* — Fitch, Even, Tabin & Flannery, LLP

(57) ABSTRACT

A method for actuating an electric motor with a motor control signal with an application-specific frequency, which signal is provided by an electronic motor control unit, wherein the electric motor is used in a vehicle roof for activating a component of this roof while being connected to a region of the roof. Embodiments provide that the electric motor can be actuated by the motor control unit with an additional signal whose frequency and amplitude are suitable for causing the region of the vehicle roof to which said electric motor is connected to oscillate in order to generate sound.

9 Claims, 1 Drawing Sheet

(56) References Cited

U.S. PATENT DOCUMENTS

| | | | |
|---|---|---|---|
| 9,048,772 | B2 | 6/2015 | Kebler et al. |
| 10,787,119 | B2 | 9/2020 | Krammer |
| 2006/0034467 | A1* | 2/2006 | Sleboda .......... H04R 5/02 381/86 |
| 2008/0100706 | A1* | 5/2008 | Breed .......... B60R 21/01536 348/143 |
| 2010/0134058 | A1 | 6/2010 | Nagashima et al. |
| 2012/0306421 | A1* | 12/2012 | Kessler .......... H02P 7/29 318/460 |
| 2017/0323631 | A1 | 11/2017 | Close et al. |

FOREIGN PATENT DOCUMENTS

| | | |
|---|---|---|
| DE | 102009056784 A1 | 6/2011 |
| DE | 102011005358 A1 | 9/2012 |
| DE | 102015224722 A1 | 6/2017 |
| DE | 102017207368 A1 | 11/2017 |
| DE | 102016223701 A1 | 5/2018 |
| DE | 102017204748 A1 | 9/2018 |
| DE | 102017209280 B3 | 10/2018 |
| EP | 0931683 A2 | 7/1999 |
| JP | H07177613 A | 7/1995 |
| JP | H09121401 A | 5/1997 |
| JP | 2011055697 A | 3/2011 |
| JP | 2014168998 A | 9/2014 |
| JP | 2017520444 A | 7/2017 |
| JP | 2017132431 A | 8/2017 |
| JP | 2017171280 A | 9/2017 |
| JP | 2018525195 A | 9/2018 |
| JP | 2019140776 A | 8/2019 |

OTHER PUBLICATIONS

Office Action issued against corresponding Japanese Patent Application No. JP 2021-538311 dated Jul. 21, 2022 in Japanese with English machine translation(8 pages).

* cited by examiner

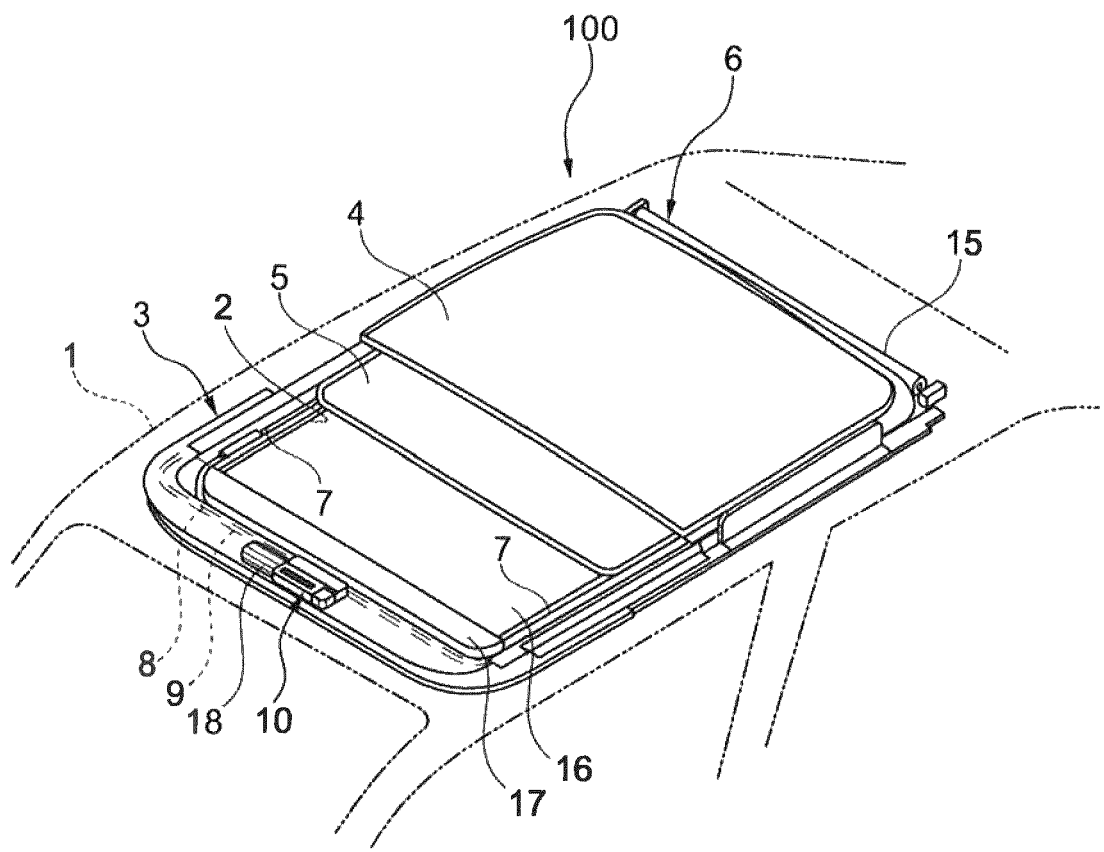

METHOD FOR USING AN ELECTRIC MOTOR TO GENERATE SOUND, SAID ELECTRIC MOTOR BEING EMPLOYED TO DRIVE A VEHICLE ROOF COMPONENT

The invention relates to a method for controlling an electric motor with a motor control signal with an application-specific frequency, which is provided by an electronic motor control unit, wherein the electric motor is used in a vehicle roof being connected to a region of the roof for operating a component of said roof.

Components of a vehicle roof, such as a sliding roof or shading blinds, are driven by an electric motor which is integrated in the vehicle roof. The electric motor is operated by a motor control signal provided by a motor control unit comprising a digital processor that executes a control program stored in a semiconductor memory, and which generates a digital motor control signal which is output in analog form to control the electric motor for program-controlled operation of the respective roof component.

When the roof/roller blind is opened and closed, noises are generated which are perceived as unpleasant and disturbing in the passenger compartment. This noise is due to the construction and has to be accepted.

One object of the invention is to overcome these disadvantages of the prior art. Here, additional benefit is drawn from the presence of an electric motor in the region of the at least partially vibrating vehicle roof for operating roof components.

This object is achieved by the features of claim 1. Advantageous further developments of the invention are defined in the subordinate claims.

The invention thus provides a method for controlling an electric motor with a motor control signal with an application-specific frequency, which is provided by an electronic motor control unit, wherein the electric motor is used in a vehicle roof being connected to a region of the roof for operating a component of said roof. According to the invention, it is provided that the electric motor can be controlled by the motor control unit with an additional signal, the frequency and amplitude of which are suitable to set the region of the vehicle roof to which it is connected into vibration for sound generation.

Additional benefit is therefore derived from the presence of the electric motor in the roof of a vehicle for operating roof components from the fact that the region of the vehicle roof to which the electric motor is attached is used for targeted sound emission. This sound emission is used according to the invention to reduce the noise associated with the operation of the electric motor and the roof component and alternatively or at the same time to emit audio information such as music into the passenger compartment. In other words, the unit of the electric motor and this driven roof component is used as a loudspeaker to emit useful signals, such as music or noise-compensation sound, as shown below using preferred embodiments of the method according to the invention.

Advantageously, at least one additional signal as the basis of the sound generation is superimposed on the motor control signal by the motor control unit. With the motor control unit, which preferably contains a digital processor, memory means, and a D/A converter as shown in the introduction, the necessary means are available to superimpose the additional signal on the motor control signal.

A completely new type of use of the electric motor together with the region of the roof to which it is attached opens up in the form of a loudspeaker formed by these components, wherein the vibrating region of the roof forms the loudspeaker membrane, while the electric motor represents the electromotive drive of the membrane.

Advantageously, the motor control unit provides the additional signal for sound generation based on predetermined data files containing audio information in digital form, which are stored in a memory of the motor control unit, and which are converted into the additional analog signal by a D/A converter comprised by the motor control unit. For example, this memory can be used either by the vehicle manufacturer as part of maintenance work or by the user of the vehicle himself with new music data files, if a suitable interface is available.

Alternatively, the motor control unit provides the additional signal for sound generation based on predetermined data files containing audio information in digital form, which are received by a receiver in the motor control unit, preferably received wirelessly, and which are converted into the analog additional signal by a D/A converter comprised by the motor control unit. In this case, music data are preferably transmitted by radio to the motor control unit, such as via Bluetooth or Zigbee. According to a further advantageous development of the method according to the invention, the additional signal for sound emission of warning tones via the region of the roof which is set into vibration by the electric motor, is designed to emit warning tones. Warning tones can be emitted, for example, when rain sets in when the sliding roof is open. In this case, the sound of raindrops on a hard object is considered as a warning tone. The sound event produced according to the invention can also be used for attenuation or reduction of undesirable noises caused by the electric motor or the movement of the vehicle roof components driven by it.

Thus, for example, the additional signal can be tuned with respect to its frequency and amplitude to the resonance behavior of the electric motor in the vibrating region of the roof in such a way that it reduces the sound portion of the motor resonance.

Alternatively or additionally, the additional signal can be selected with respect to its frequency and amplitude in such a way that functional noise of vehicle components driven by the electric motor is reduced.

The following scenarios can be considered as application examples:

Grinding noise of a broadband drive cable
Switching noise of the mechanics when opening/closing/tilting
Sprocket engagement with the drive cable
Noise from the roller blind It is preferably possible to provide suitable sensors such as accelerometers or vibration transducers on the roof or nearby and to generate counter-noise in real time. There is also the possibility to generate counter-noise at the respective position using knowledge of the motor position and exactly where which noise is generated in the various scenarios recognized by the position of the motor. Both options can also be combined.

In the context of the method according to the invention, the electric motor may form part of a drive for a vehicle sliding roof, a vehicle wind shield or a shading means for a vehicle window of a transparent vehicle sliding roof.

The invention is explained in more detail below on the basis of the drawing. The only FIGURE in the drawing, FIG. 1, shows a vehicle sliding roof arrangement 100 which is driven by an electric motor, in the present case of a passenger vehicle.

In this description, in order to simplify the explanation, the front in the vehicle longitudinal direction according to the direction of travel is referred to as the "front", the rear side as the "rear", the left side in the direction of travel as "left" and the right side is referred to as "right".

The sliding roof arrangement 100 is in an opening 2 of a vehicle roof 1. The sliding roof arrangement 100 comprises a frame 3, which is arranged along the opening edge of the opening 2, a fixed roof panel 4 (a glass panel in the present embodiment), which is fixed firmly to approximately the rear half of the frame 3 (not shown) to open and close the opening 2, a movable roof panel 5 and a roller device 6, which is attached to the bottom of the fixed roof panel 4.

An opening and closing mechanism for the movable roof panel includes a pair of left and right cams which are connected to a roof panel support strip that is attached to the bottom of the movable roof panel 5 by means of sliders. The left and right sliders are each connected to a left and right guide rail 7, which form the left and the right sides of the frame 3, so that they can be moved forwards and backwards. If the two sliders are moved forwards and backwards, the movable roof panel 5 can slide in these directions and can be tilted together with its support. The sliders are driven by a drive unit 10 containing an electric motor 18 via a first transmission cable 8.

A roller blind device 6 has a winding roller 15 which extends in the vehicle lateral direction, and a shading roller blind (a light shielding film) 16, which is wound around the winding roller 15. A cladding means 17 which extends in the vehicle lateral direction is used to cover the roller blind 16. The roller blind 16 is opened and closed by moving corresponding runners forwards and backwards along the guide rail 7. These runner sections are driven by the drive unit 10 via a second cable gear 9.

The control of the electric motor 18 of the drive unit 10 is carried out via a motor control signal with an application-specific frequency, which is provided by an electronic motor control unit which is not shown. The electric motor 18 is connected to a front region of the vehicle roof 1. The electric motor 18 can be controlled in addition to the motor control signal with an additional signal, the frequency and amplitude of which are suitable to set the region of the vehicle roof to which the electric motor 18 is connected into vibration for sound generation. Said region of the vehicle roof thus acts as a loudspeaker, and the signal generated by it is used either to play back audio information or to reduce the noise associated with operation of the electric motor and of the roof component (operation of the sliding roof and of the roller blind).

REFERENCE CHARACTER LIST

100 Sliding roof arrangement
1 Vehicle roof
2 Opening
3 Frame
4 Fixed roof panel
5 Movable roof panel
6 Roller device
7 Guide rail
8 Transmission cable
9 Cable transmission
10 Drive unit
15 Winding roller
16 Roller blind
17 Cladding
18 Electric motor

The invention claimed is:

1. A method for controlling an electric motor with a motor control signal with an application-specific frequency, which is provided by an electronic motor control unit, wherein the electric motor is used in a vehicle roof being connected to a region of the roof for operating a component of said roof, wherein the method comprises the steps of:
   controlling the electric motor by the motor control unit with an additional signal, and
   setting the frequency and amplitude of the additional signal so as to set the region of the vehicle roof, to which it is connected, into vibration for sound generation.

2. The method as claimed in claim 1, comprising the step of superimposing the additional signal on the motor control signal by the motor control unit.

3. The method as claimed in claim 1, wherein the additional signal is an audio signal.

4. The method as claimed in claim 3, wherein the motor control unit provides the additional signal for sound generation on the basis of predetermined data files containing audio information in digital form, which are stored in a memory of the motor control unit, and which are converted into the analog additional signal by a D/A converter comprised by the motor control unit.

5. The method as claimed in claim 3, comprising the step of the motor control unit providing the additional signal for sound generation based on predetermined data files containing audio information in digital form, which are received by a receiver in the motor control unit, and which are converted into the analog additional signal by a D/A converter comprised by the motor control unit.

6. The method as claimed in claim 1, wherein the additional signal for the sound emission of warning tones via the region of the roof which is set in vibration by the electric motor, is designed to emit warning tones.

7. The method as claimed in claim 1, wherein the additional signal is tuned with respect to its frequency and amplitude to the resonance behavior of the electric motor in the region of the roof which is set into vibration so that it reduces the sound portion of the electric motor resonance.

8. The method as claimed in claim 1, comprising the step of choosing the additional signal with respect to its frequency and amplitude so as to reduce functional noise of vehicle components driven by the electric motor.

9. The method as claimed in claim 1, wherein the electric motor is part of a drive for a vehicle sliding roof, a vehicle wind shield or a shading means for a vehicle window of a transparent vehicle sliding roof.

* * * * *